United States Patent

Miyazaki et al.

[11] Patent Number: 6,130,508
[45] Date of Patent: Oct. 10, 2000

[54] METHOD AND APPARATUS FOR OPERATING A DISCHARGE LAMP TO REDUCE THE CURVATURE OF ITS DISCHARGE ARC

[75] Inventors: Koji Miyazaki, Hirakata; Satoshi Kominami, Katano; Shigeru Horii, Takatsuki, all of Japan

[73] Assignee: Matsushita Electric Industrial Co., Ltd., Osaka, Japan

[21] Appl. No.: 09/160,274

[22] Filed: Sep. 24, 1998

[30] Foreign Application Priority Data

Sep. 26, 1997 [JP] Japan ................................. 9-261668

[51] Int. Cl.[7] .................................................. H05B 37/02
[52] U.S. Cl. ...................... 315/209 R; 315/246; 315/287
[58] Field of Search ................................ 315/224, 209 R, 315/246, 287

[56] References Cited

U.S. PATENT DOCUMENTS

| | | |
|---|---|---|
| 4,983,889 | 1/1991 | Roberts . |
| 5,121,034 | 6/1992 | Allen et al. . |
| 5,198,727 | 3/1993 | Allen et al. . |
| 5,270,620 | 12/1993 | Basch et al. . |
| 5,436,533 | 7/1995 | Fromm et al. . |
| 5,773,937 | 6/1998 | Miyazaki et al. ........................ 315/246 |

FOREIGN PATENT DOCUMENTS

| | | |
|---|---|---|
| 7-66866 | 12/1990 | Japan . |
| 5-57693 | 3/1991 | Japan . |
| 7-9835 | 11/1992 | Japan . |
| 7-14684 | 1/1995 | Japan . |

OTHER PUBLICATIONS

U.S. application, No. 08/915,641, filed Aug. 21, 1997, by Miyazaki et al.

*Primary Examiner*—David Vu
*Attorney, Agent, or Firm*—Ratner & Prestia

[57] ABSTRACT

A discharge lamp operating apparatus has a glass envelope for defining a discharge space and a pair of electrodes which are hermetically sealed within the glass envelope and are opposed to each other. The apparatus includes (1) generation element for generating a waveform signal having an acoustic resonant frequency for exciting a mode, in which a discharge arc between the pair of electrodes is straightened and (2) modulation element for modulating the waveform signal so that a polarity of the center line of the waveform signal is alternately changed at a lower frequency than the acoustic resonant frequency. If the value of the amplitude of the waveform signal from peak to peak is $\alpha$, and the effective value of the modulated waveform signal is $\beta$, then the depth of modulation $\alpha/\beta$ at the beginning of operation is equal to or less than the depth of modulation $\alpha/\beta$ at an operation under rated condition.

29 Claims, 10 Drawing Sheets

(a)

(b)

(c)

(a)

(b)

Lapsed time after operating

Lapsed time after operating

METHOD AND APPARATUS FOR OPERATING A DISCHARGE LAMP TO REDUCE THE CURVATURE OF ITS DISCHARGE ARC

BACKGROUND OF THE INVENTION

1. Field of the Invention

The present invention relates to a discharge lamp operating apparatus capable of reducing a curvature of a discharge arc due to gravity-induced convection caused when a discharge lamp, particularly a HID lamp (high intensity discharge lamp) is horizontally lighted.

2. Related Art of the Invention

In recent years, HID lamps have been widely used in outdoor lighting field and the like because of features of high efficiency and long life. Of these, metal halide lamps have good color rendering property, and are becoming widespread in not only the outdoor lighting field, but also the indoor lighting field by making the best use of the special property, and further are receiving attention as a light source for video equipment and as a light source for head lamps of vehicles.

In a conventional discharge lamp operating apparatus, when operating is made with a several KHz or more high frequency, a harmful acoustic resonance phenomenon occurs, and variations, flame failure, and the like of the discharge arc have occurred. As a method for solving such problems, there is a method described in Collection of Theses No. 10 of Tokyo Branch Conference of the Lighting Society in 1983. It is disclosed that this discharge lamp operating apparatus is capable of preventing variations, flame failure and lamp destruction of the discharge arc resulting from an acoustic resonance phenomenon peculiar to a HID lamp, which is a discharge lamp, and stably operating by supplying rectangular wave current of a low frequency (several hundred Hz) to the HID lamp.

When, however, the HID lamp is horizontally lighted in a operating apparatus of this type, operating can be stably made, but the discharge arc upwardly curves as a bow is drawn under the influence of gravity-induced convection caused due to temperature distribution occurring within the discharge space. This greatly increases the temperature in the upper portion of the discharge space to cause significant degradation, i.e., devitrification or deformation to quartz glass, which is glass envelope material for defining the discharge space, thus leading to a problem that the lamp life will become shorter, and the lamp efficiency will be lowered due to the lowered coldest point temperature in the lower portion of the discharge space.

Particularly in recent years, in the metal halide lamp, which is receiving attention as a light source for video equipment and a light source for head lamps of vehicles, the use of shorter arcs is proceeding, and it is necessary to further increase the pressure which is caused by the filling material in the discharge space while the lamp is operating. The increase in the pressure increases the gravity-induced convection, making the curvature of the discharge arc larger, and further worsening the lamp life and the efficiency.

As a discharge lamp operating apparatus which solves this problem, there is one described in Japanese Patent Publication No. 7-9835. The discharge lamp operating apparatus will be described with reference to FIG. 10.

FIG. 10 is a view showing variations in lamp current waveform with respect to lapsed time after operating when a discharge lamp is caused to light in a conventional discharge lamp operating apparatus (Japanese Patent Publication No. 7-9835) described above. This is obtained by superposing AC waveform 52 on DC waveform 51. The operation of this AC waveform 52 causes acoustic resonance of a specified pattern to reduce the influence of gravity-induced convection of the filling material in the discharge lamp, and as a result, the discharge arc becomes straight.

As this physical background, it is considered that a compression wave of a frequency determined by the AC waveform 52 is produced from the discharge arc to generate a standing wave, which forcibly causes the discharge arc, which is going to curve, to become straight.

When the discharge arc is made straight, there are advantages that it is possible to lower the temperature of quartz glass in the upper portion of the discharge space, which is the cause for shortening the life of the discharge lamp, for extending the life of the discharge lamp, and to improve the luminous efficiency by an increase in the coldest point temperature in the lower portion of the discharge space among others.

Further in FIG. 10, if the level of the DC waveform 51 is made high in advance in a period until the discharge lamp reaches operation under the rated condition, it will be possible to obtain a predetermined optical output immediately after operating. At the same time, it will be possible to reduce a rate (a value obtained by dividing what obtained by subtracting the minimum value from the maximum value of the AC waveform 52, by the value of the DC waveform 51) of a ripple occurring in the AC waveform 52 to the level of the DC waveform 51 during the period until the discharge lamp reaches operation under the rated condition. Therefore, it suggests that the discharge arc does not become unstable, but it is possible to obtain a stable discharge arc from the beginning of operating of the discharge lamp even if gas temperature within the discharge space changes, and the frequency which makes the discharge arc straight changes during the period until the discharge lamp reaches operation under the rated condition.

In the above-described conventional discharge lamp operating apparatus, however, since an electric current flows through the discharge lamp in one direction, there always arises an electric field in one direction although the electric field intensity in the discharge space of the discharge lamp changes periodically. For this reason, there was a problem that irregular color occurs in the discharge arc because of a cataphoresis phenomenon in which filling material shifts toward one side. Also, since temperature on the electrode shaft is in an asymmetrical temperature distribution in which the temperature on the anode side is high while that on the cathode side is low, the curvature of the discharge arc becomes more or less smaller, but does not become that much straight even if a frequency which excites a mode in which the discharge arc is made straight is superimposed.

The present inventor et al. have referred to Japanese patent application (Japanese Patent Application No. 8-220938, 9-69502 and 9-225001) or U.S. patent application Ser. No. 08/915641).

The content is as follows: A discharge lamp operating apparatus for operating a discharge lamp, having a glass envelope for defining a discharge space and a pair of electrodes which are hermetically filled within the glass envelope and are opposed to each other, comprising:

generation means for generating a waveform signal having a frequency component of an acoustic resonant frequency for exciting a mode in which a discharge arc occurring between the pair of electrodes is made straight, and whose waveform center line is at a constant level; and modulation means for modulating the waveform signal so that the polarity is alternately changed at a modulation frequency which has the center line of the waveform signal lower than the frequency component of the acoustic resonant frequency".

In accordance with the invention of this prior application, a sufficiently straight discharge arc could be realized. Even in the invention of the prior application, the following can be considered:

That is, in the case of operating after the discharge lamp has sufficiently long extinction, the discharge space has uniform temperature distribution which substantially coincides with the ambient temperature of the discharge lamp, and therefore, the discharge is not greatly deformed, but is most easily performed in the shortest distance between a pair of electrodes, that is, a straight track at dielectric breakdown when discharge starts, and thereafter, this discharge can develop into a discharge arc to obtain a stable, straight discharge arc.

In contrast, in the case of operating again before the extinction is sufficiently long, there can be expected a drawback that there may be cases where no stable, straight discharge arc could be obtained.

This is attributed to the fact that under the influence of temperature distribution (position where the discharge arc exists: about 5,000 K to 7,000 K, near the glass envelop: about 1,000 K) in the discharge space which occurs during operating of the discharge lamp, the temperature in the vicinity of the center of the discharge space where the discharge arc existed is higher than that in the vicinity of the glass envelop for a predetermined period even after the light is put out.

When discharge from the discharge lamp starts in a state having un-uniform temperature distribution within the discharge space, the high-temperature portion in which a discharge arc existed has significant kinetic energy of particles within the discharge space, is greatly curved so as to avoid it for discharging, and since this discharge curved becomes a starting point, a distorted discharge arc is formed between a pairs of electrodes.

Once a discharge arc, which is a source for generating a compression wave, is curved and generated, the compression wave is generated from the curved state and becomes stable in a curved state as it is.

SUMMARY OF THE INVENTION

The present invention has been achieved to solve the above-described problems, and its object is to provide a discharge lamp operating apparatus capable of stably generating a straight discharge arc irrespective of extinction or the like of the discharge lamp.

The present invention is a discharge lamp operating apparatus for operating a discharge lamp having a glass envelope for defining a discharge space and a pair of electrodes which are hermetically sealed within said glass envelope and are opposed to each other, comprising: generation means for generating a waveform signal having a frequency component of an acoustic resonant frequency for exciting a mode, in which a discharge arc occurring between said pair of electrodes is made straight; and modulation means for modulating said waveform signal so that a polarity of a center line of said waveform signal is alternately changed at such a modulation frequency having a lower frequency than the frequency component of said acoustic resonant frequency, wherein there exists a period in which, assuming a value of said waveform signal from peak to peak to be $\alpha$, and an effective value of said signal modulated to be $\beta$, a depth of modulation $\alpha/\beta$ at a beginning of operating becomes equal to or less than a depth of modulation $\alpha/\beta$ at an operation under the rated condition.

DETAILED DESCRIPTION OF PREFERRED EMBODIMENTS

Hereinafter, with reference to the drawings, the description will be made of embodiments according to the present invention.

Before describing the embodiments according to the present invention, the above-described invention of previous application will be summed up and described.

Figure 1:
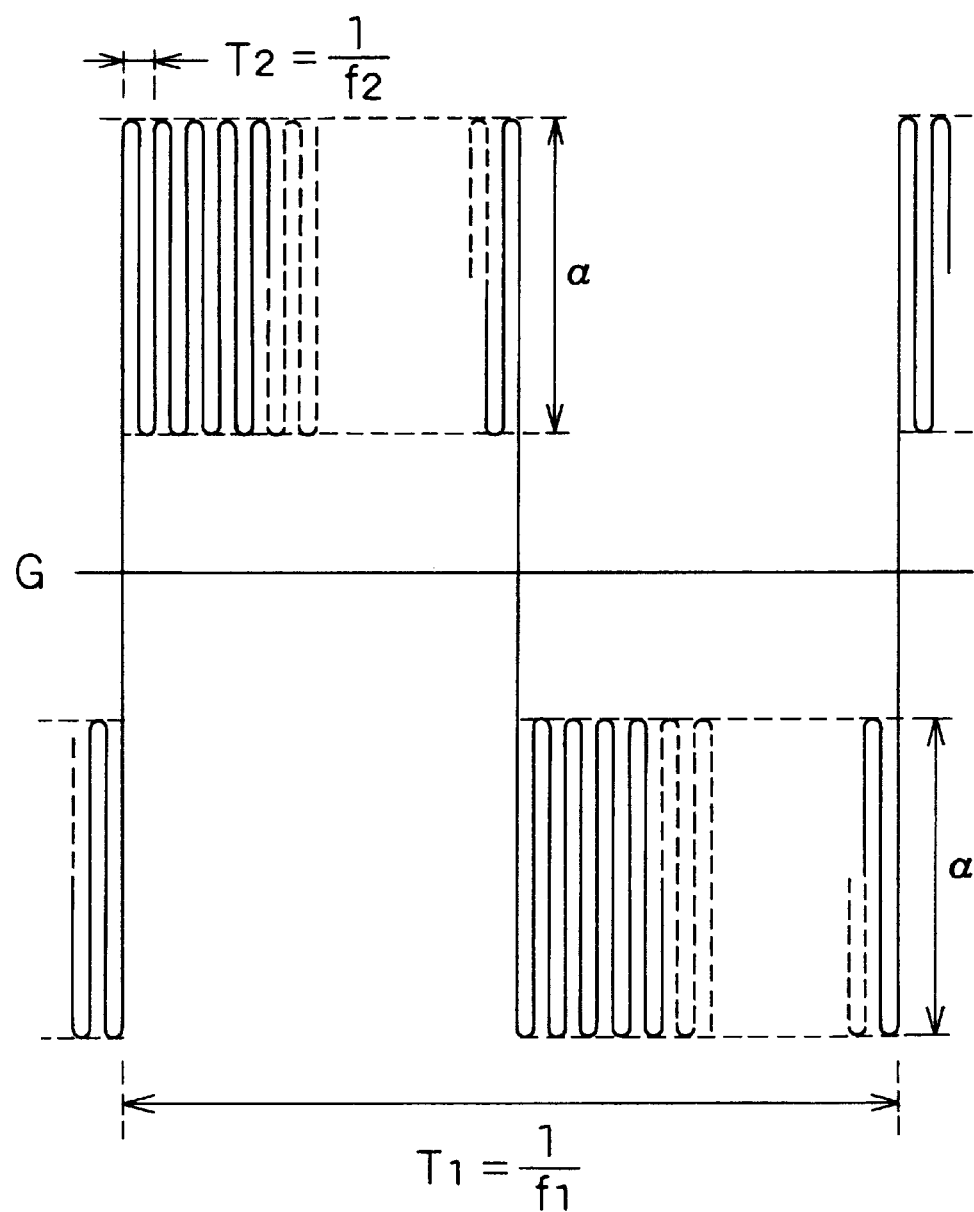
FIG. 1 is a view showing an example of waveform for making the discharge arc from a discharge lamp straight in an embodiment according to the present invention.

FIG. 1 shows an example of waveform for making the discharge arc from a discharge lamp straight. This waveform aims at the frequency component f2 of the acoustic resonant frequency for exciting a mode in which the discharge arc is made straight, which is determined by sound velocity of the discharge lamp in the discharge space medium and the length of the discharge space which intersects the discharge arc. This frequency component f2 can be obtained when re-ignited after extinction of the discharge lamp is taken sufficiently long. As waveform, whose instantaneous value periodically fluctuates at the frequency component f2, there is used waveform obtained by modulating the waveform of the frequency component f2 of the acoustic resonant frequency so that the polarity is changed at a modulation frequency f1 which is lower than the frequency component f2 of the acoustic resonant frequency.

First, when the current waveform shown in FIG. 1 is supplied to a discharge lamp and the depth of modulation (a value obtained by dividing α by the effective value β of the waveform (modulated signal waveform) of FIG. 1) is set to a predetermined value, it is possible to obtain a stable, straight discharge arc at the time of operation under the rated condition if extinction of the discharge lamp is sufficiently long.

Figure 2:
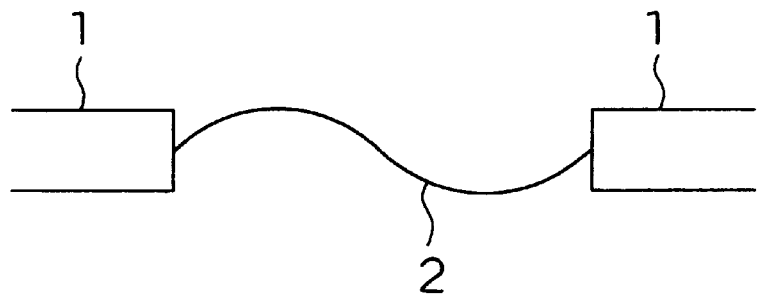
FIGS. 2(a) to 2(c) are views schematically showing the result obtained by observing a state of growth of a discharge arc when a discharge lamp is caused to re-ignite in waveform shown in FIG. 1 before extinction becomes sufficiently long.
Figure 2:
Figure 2:

However, FIGS. 2(a) to 2(c) are views schematically showing a result obtained by observing a state of growth of a discharge arc when the discharge lamp is caused to re-ignite at the waveform shown in FIG. 1 before extinction thereof becomes sufficiently long. In FIG. 2(a), numeral 1 designates a pair of electrodes which are hermetically sealed within a glass envelope and are opposed to each other, and numeral 2 designates a discharge arc generated between the pair of electrodes 1. FIG. 2(a) is an example showing a state of dielectric breakdown when the discharge lamp starts discharging. Although the discharge occurs between electrodes 1, FIG. 2(a) shows an example in which the discharge has an S-shaped configuration, but other discharges are largely curved in the glass envelope direction, and there are few cases where discharge is performed over the shortest distance between the electrodes 1, i.e., straight. This is attributable to the un-uniform temperature distribution within the discharge space after putting out the light as described above.

FIG. 2(b) shows a state of the discharge arc until operation under the rated condition is reached after the discharge starts, and the discharge arc grows as it maintains the curved state of the discharge arc shown in FIG. 2(a). Also, FIG. 2(c) shows a state of the discharge arc when operation under the rated condition is reached, and it can be seen that any stable, straight discharge arc cannot be obtained.

Figure 3:
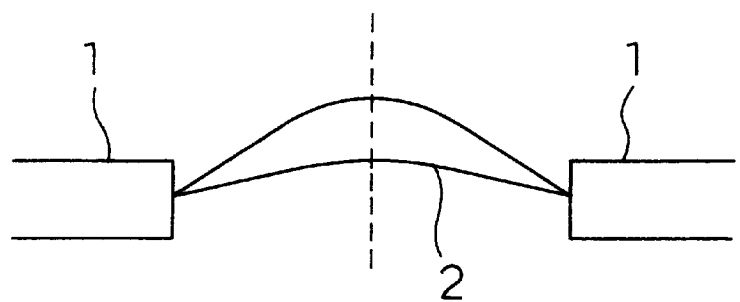
FIG. 3(a) is a view showing the shape of a discharge arc when the depth of modulation is made small.
FIG. 3(b) is a view showing the shape of a discharge arc when the depth of modulation is made large after the depth of modulation is made small.
Figure 3:
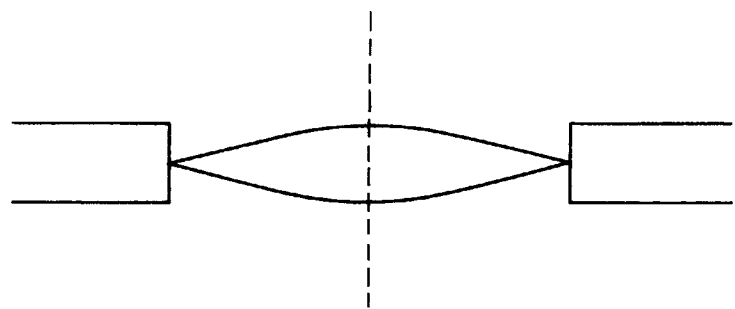

The present inventor found out that prevention of deformation of this discharge arc is closely related to the depth of modulation. FIG. 3(a) shows the shape of the discharge arc when the depth of modulation is made smaller by making α in FIG. 1 smaller from the state shown in FIG. 2(b) or FIG. 2(c). In FIG. 3(a), numeral 1 designates a pair of electrodes which are opposed to each other, and numeral 2 designates a discharge arc occurring between the pair of electrodes 1 as in the case of FIG. 2(a). If the depth of modulation is made smaller, the intensity of a compression wave emitted from the discharge arc becomes lower, and the level of acoustic resonance also becomes lower.

Therefore, the deformation of the discharge arc is mainly caused under the influence of buoyancy due to gravity-induced convection caused by temperature distribution (center of discharge arc: about 5,000 K to 7,000 K, near the glass envelope: about 1,000 K) within the discharge space during operating, and the discharge arc is slightly curved upwardly.

In this respect, the depth of modulation is preferably set to 0.3 or less in order to sufficiently reduce the influence of the acoustic resonance.

FIG. 3(b) shows a shape of the discharge arc when the depth of modulation is once made smaller and thereafter is made larger. A stable, straight discharge arc can be formed.

Since there is a wide temperature distribution in the case of short extinction, the discharge arc occurring curves largely. If, however, the depth of modulation is made small in advance then, there will be arisen only influence of buoyancy due to gravity-induced convection. Thus, the discharge arc is only curved under the influence of buoyancy due to gravity-induced convection immediately. When the depth of modulation is made large, a compression wave is generated from the discharge arc in the state, and therefore, a stable, straight discharge arc is generated. In this respect, there is a wide temperature distribution at the time of re-ignition after short extinction as described in the invention of prior application, and when the depth of modulation is made large at the beginning with the discharge arc occurring largely curved, a compression wave is generated from the discharge arc curved, and therefore, the discharge arc will not become straight.

In this respect, such technical analysis is strictly a presumption, and it can be considered that a stable, straight discharge arc could be obtained in accordance with another physical law.

Figure 4:
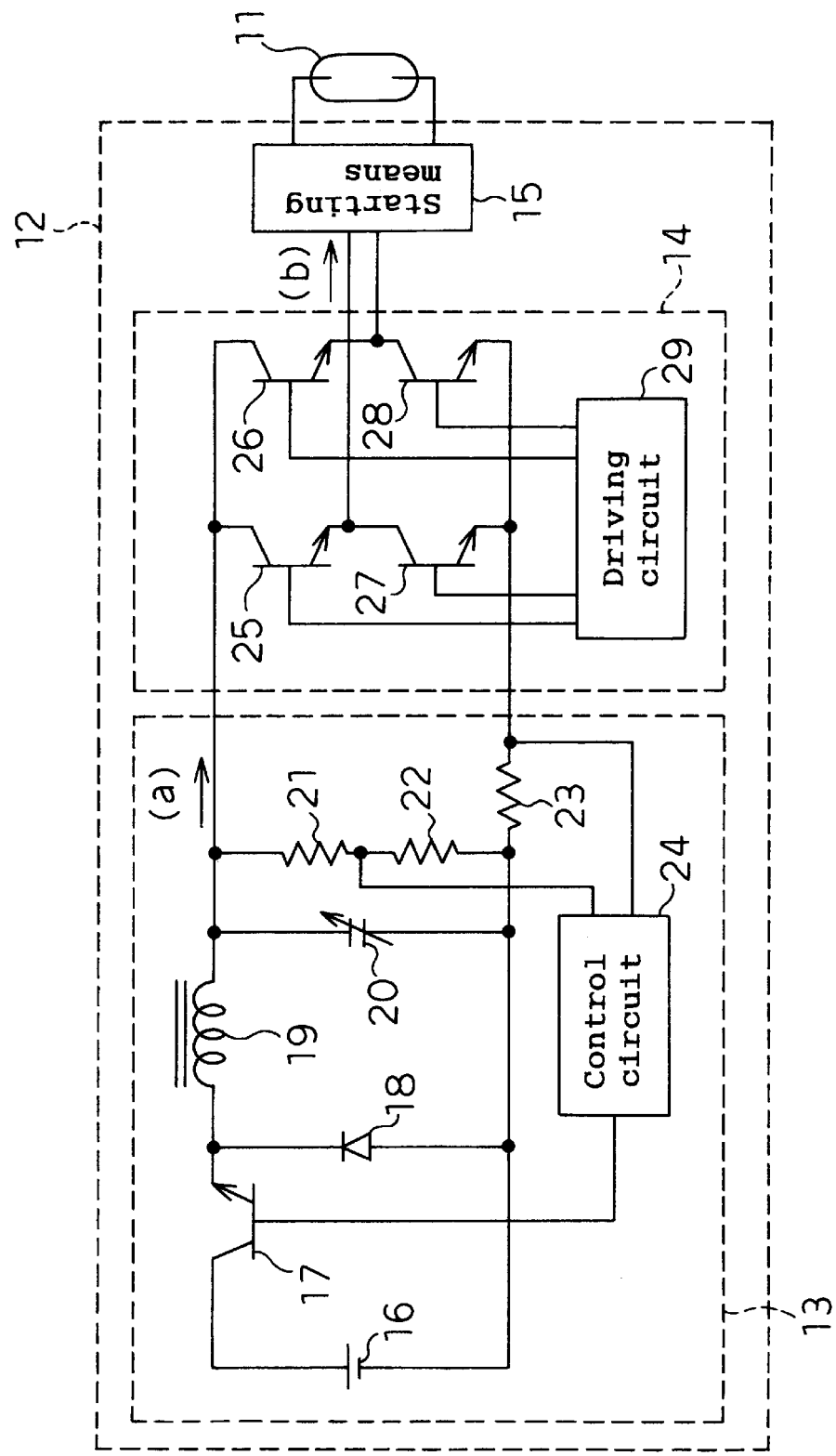
FIG. 4 is a structural view showing a discharge lamp operating apparatus according to a first embodiment of the present invention.

Hereinafter, with reference to the drawings, the description will be made of a first embodiment according to the present invention. FIG. 4 is a structural view showing the first embodiment, in which numeral 11 designates a discharge lamp in which mercury and metal halide have been hermetically sealed as filling material within a glass envelope for defining the discharge space. Numeral 12 designates operating means for supplying the waveform of FIG. 1 to the discharge lamp 11 for operating. The operating means 12 comprises: in the case of re-ignition after sufficient extinction, a DC power source 13, which is generation means for generating a waveform signal which has waveform having a frequency component of an acoustic resonant frequency for exciting a mode, in which the discharge arc is made straight, whose center line is maintained at a constant level; an inverter circuit 14, which is modulation means for modulating the waveform signal so that the polarity is alternately changed at a modulation frequency, which has the center line of the waveform signal lower than the acoustic resonant frequency; and starting means 15 for applying a high voltage enough to start discharging of the discharge lamp 11 thereto. In this respect, the center line of the waveform which the DC power source 13 generates may not always be at a constant level.

Figure 5:
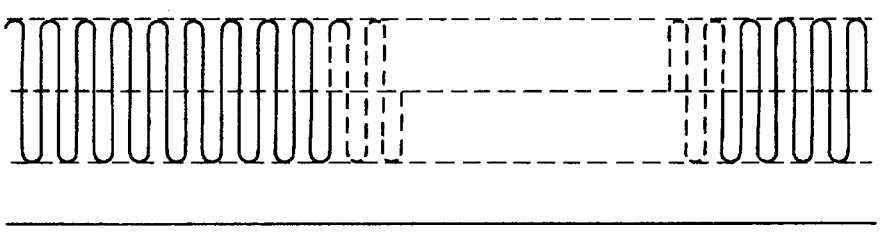
FIG. 5(a) is an output current waveform view for DC power source 13.
FIG. 5(b) is an output current waveform view for an inverter circuit 14.
Figure 5:
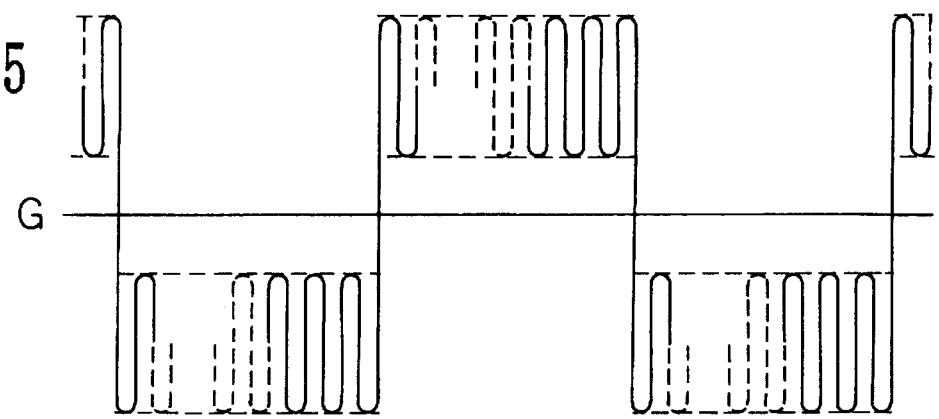

The operation of the first embodiment structured as described above will be described with reference to FIG. 5.

In a DC power source 13, a step-down chopper circuit is constituted by: a DC power source 16; a transistor 17; a diode 18; a chopper coil 19; and a capacitor 20 capable of varying its electrostatic capacity, in such a manner that the lamp power is calculated by a control circuit 24 from a detection signal corresponding to lamp voltage detected by resistance 21 and 22, and a detection signal corresponding to lamp current detected by resistance 23, and further that the on-off ratio of the transistor 17 is made variable so that the lamp power becomes a rated value.

If the on-off frequency of the transistor 17 is set to an acoustic resonant frequency for exciting the mode in which the discharge arc is made straight, and a filter circuit consisting of the choke coil 19 and the capacitor 20 is caused to have the special property in which the frequency component of the acoustic resonant frequency is not cut, the output current waveform of the DC power source 13 will become a waveform in which a predetermined DC bias is superposed on a center line whose instantaneous value periodically fluctuates at an acoustic resonant frequency for exciting the mode in which the discharge arc is made straight as shown in FIG. 5(a).

Figure 6:
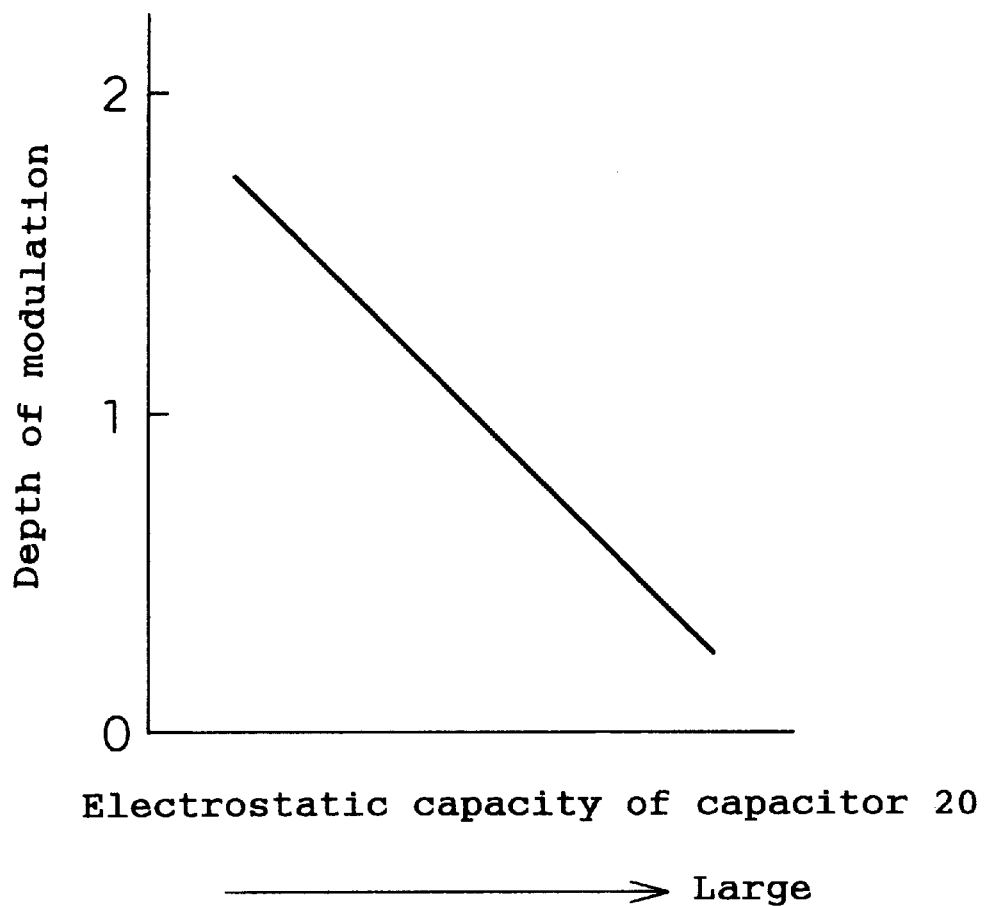
FIG. 6 is a view showing relationship between the electrostatic capacity of a capacitor 20 and the depth of modulation.

An inverter circuit 14 is constituted by transistors 25, 26, 27 and 28, and a driving circuit 29 in such a manner that a period in which the transistors 25 and 28 are turned on and a period in which the transistors 26 and 27 are turned on are caused to alternately occur through an output signal from the driving circuit 29, whereby the output waveform from the DC power source 13 is converted into such waveform as shown in FIG. 5(b) whose polarity is alternately changed at a modulation frequency, which is lower than the acoustic resonant frequency to supply it to the discharge lamp 11. The discharge lamp 11 which has started discharging at high voltage of starting means 15 lights at the waveform shown in FIG. 5(b). Also, FIG. 6 shows relationship between the electrostatic capacity of the capacitor 20 and the depth of modulation, and the depth of modulation becomes smaller as the electrostatic capacity of the capacitor 20 is increased, while the depth of modulation becomes larger as the electrostatic capacity is decreased.

Figure 7:
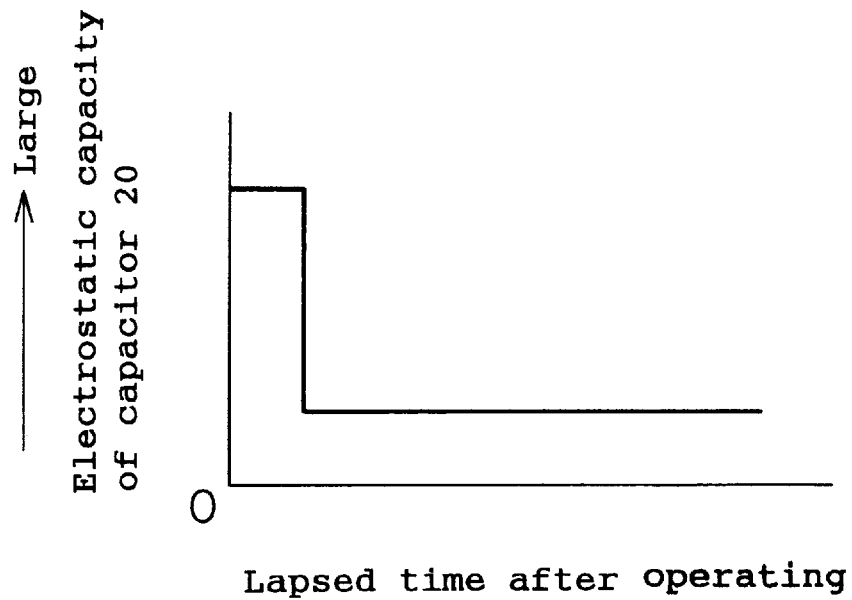
FIGS. 7(a) and 7(b) are views showing an example of change characteristic of the electrostatic capacity of the capacitor 20 with respect to elapsed time after operating.
Figure 7:
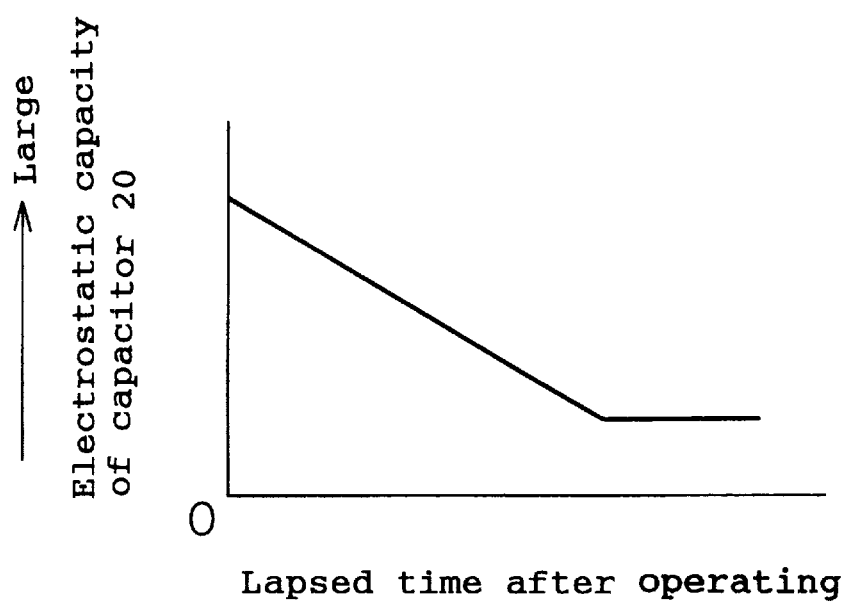

In the first embodiment constructed as described above, FIGS. 7(a) and 7(b) show an example of change characteristic of the electrostatic capacity of the capacitor 20 with respect to elapsed time after operating. If a predetermined electrostatic capacity of a feedback capacitor 20 after operating is made large, and is stepwise made smaller as shown in FIG. 7(a), it is possible to stepwise increase the depth of modulation of the discharge lamp 11 at the beginning of operating. At this time, the discharge arc slightly curves upwardly while the depth of modulation is small, and thereafter, it is switched to a straight discharge arc. Therefore, visual flicker due to a change in the shape of the discharge arc is predicted, but it is possible to prevent the flickering by setting a period in which the electrostatic capacity of the capacitor 20 is large to 10 ms or less.

Also, FIG. 7(b) shows that the electrostatic capacity of the capacitor 20 is made large during a predetermined period after operating, and is gradually made smaller, and the depth of modulation of the discharge lamp 11 at the beginning of operating can be gradually increased.

At this time, the shape of the discharge arc gradually changes from a curved discharge arc to a straight discharge arc, and does not change instantaneously. Therefore, there is provided a remarkable effect that it is possible to prevent the visual flicker, and also to prevent an unstable operation of the discharge arc which is likely to occur at transient time of switching from the curved discharge arc to the straight discharge arc.

Figure 8:
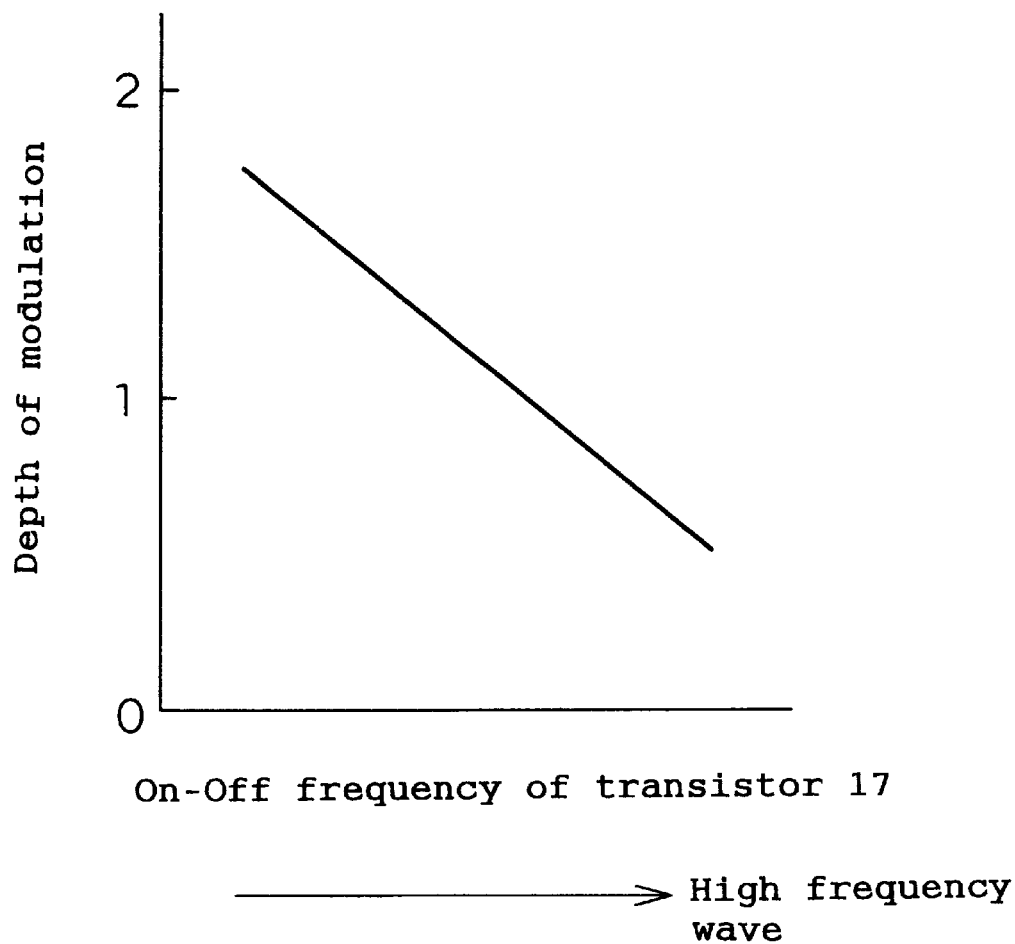
FIG. 8 is a view showing relationship between on-off frequency of a transistor 17 and depth of modulation.

Next, a second embodiment will be described. FIG. 8 shows relationship between the on-off frequency of the transistor 17 when the electrostatic capacity of the capacitor 20 in the first embodiment is made constant, and the depth of modulation. When the on-off frequency of the transistor 17 is made higher, the depth of modulation becomes smaller, while when the on-off frequency is made lower, the depth of modulation becomes larger. This is attributable to the special property that higher frequency components are cut from the frequency characteristic determined by the inductance of the choke coil 19 and the electrostatic capacity of the capacitor 20 in the filter circuit.

When the special property of FIG. 8 is utilized, it is possible to have lower depth of modulation at the beginning of operating than during operation under the rated condition by such simple construction that the on-off frequency of the transistor 17 is only made high at the beginning of operating of the discharge lamp 11, and the structure of the operating means 12 is very simplified. Also, it is possible to change the depth of modulation stepwise or gradually only by changing the on-off frequency of the transistor 17 stepwise or gradually in an analog fashion. Further, during a period until the discharge lamp 11 reaches operation under the rated condition since the beginning of operating, an acoustic resonant frequency for exciting the mode in which the discharge arc is made straight, is a function of gas temperature within the discharge space, and has the special property that it decreases until this gas temperature reaches operation under the rated condition. Therefore, the acoustic resonant frequency which makes the discharge arc straight has the special property that it decreases until operation under the rated condition is reached.

When the structure is arranged such that there is provided frequency varying means which changes the on-off frequency of the transistor 17 so as to synchronize with the change in the acoustic resonant frequency, the stability of the discharge arc at the beginning of operating is improved, and it is possible to obtain a stable, straight discharge arc from the beginning of operating to operation under the rated condition irrespective of extinction of the discharge lamp.

In this respect, in the above-described embodiments, for the discharge lamp 11, both a HID lamp such as a high-pressure mercury lamp, a metal halide lamp and a high-pressure sodium lamp, and a low-pressure discharge lamp such as a fluorescent lamp may be used, and any lamp may be used so long as it is a discharge lamp.

In the first embodiment, the structure has been arranged such that the electrostatic capacity of the capacitor 20 is caused to change with the lapse of time after operating of the discharge lamp 11 to make the depth of modulation variable, but it may be possible to construct such that detection means for detecting the lamp characteristic is provided to detect whether or not it is at the beginning of operating, and that the electrostatic capacity of the capacitor 20 is made variable in response to output from the detection means. By such construction as to detect the lamp characteristic, it is possible to detect a different state of the lamp at the beginning of operating from the lamp characteristic on the basis of extinction and the like of the discharge lamp, and therefore, how to change the depth of modulation can be controlled to an optimum value. Also, as the lamp characteristic, it is easy to detect electric characteristic of the discharge lamp such as lamp voltage and lamp impedance, or optical output, or bulb temperature, or the like and the construction is also simple.

Also, when the depth of modulation is increased stepwise, in this embodiment, the description has been made of an example in which the depth of modulation is increased at one stage, but the construction in which it is increased at two or more stages may be used. If the depth of modulation is increased at more stages, the structure can be arranged such that the shape of the discharge arc is gradually changed from a curved discharge arc to a straight discharge arc, and therefore, it is effective to prevent a visual flicker.

Figure 9:
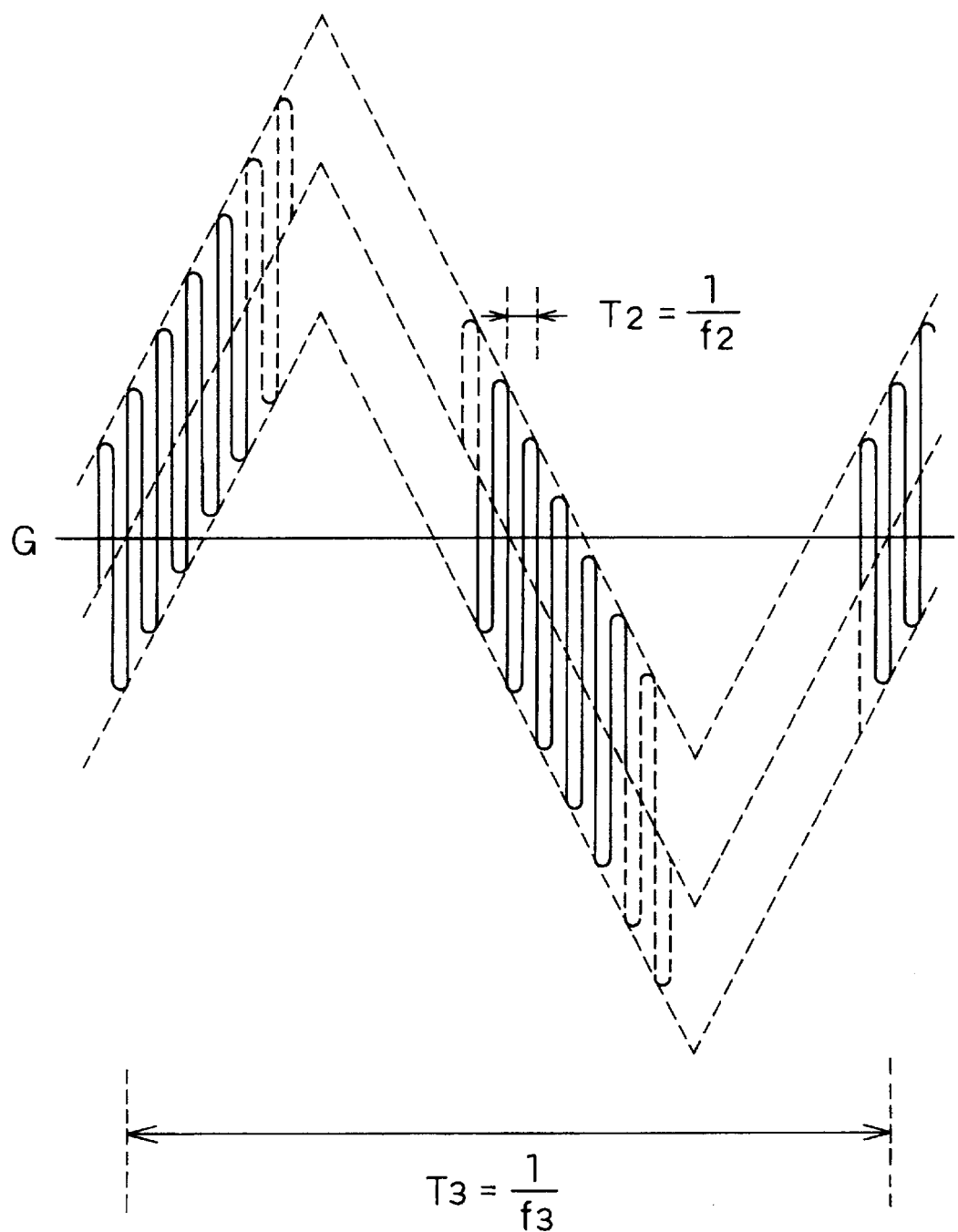
FIG. 9 is a view showing another example of waveform for making the discharge arc from a discharge lamp straight in an embodiment according to the present invention.
Figure 10:
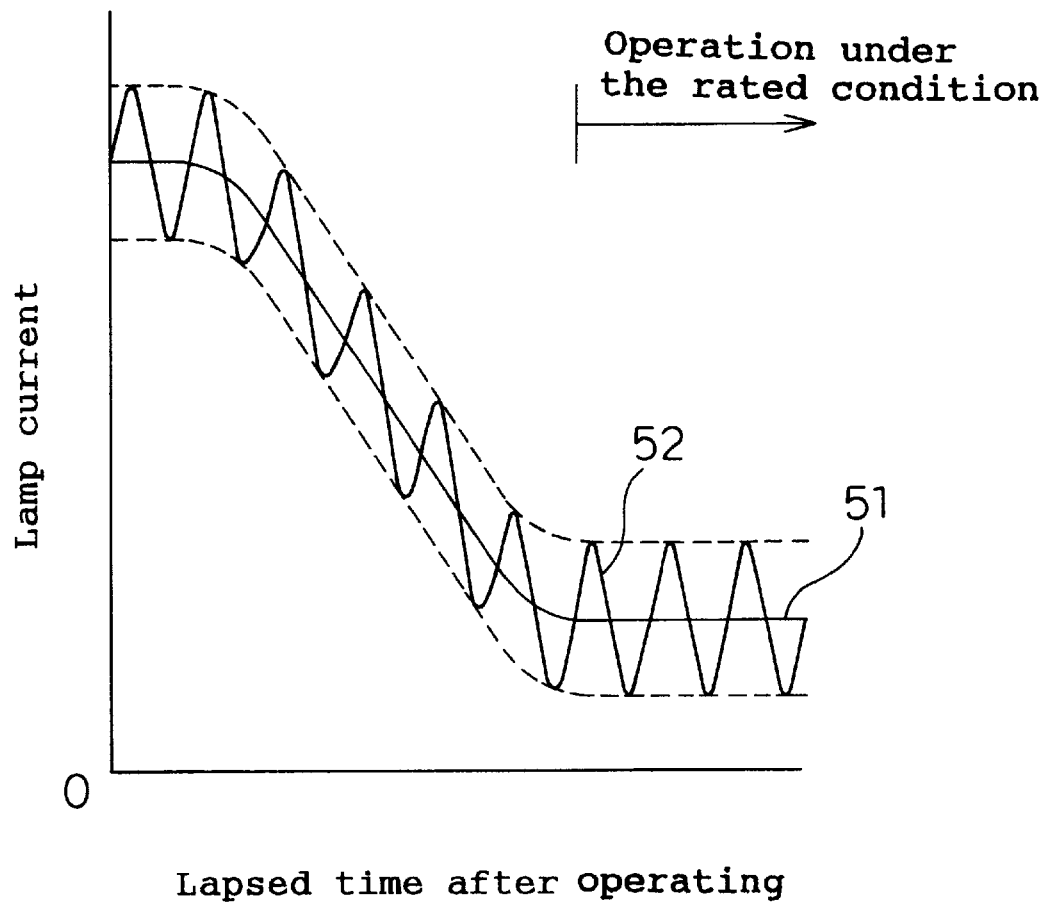
FIG. 10 is a lamp current waveform view when the discharge lamp is caused to light in a conventional discharge lamp operating apparatus.

Also, although the inverter circuit 14 has been modulated like a rectangular wave, it may be possible to construct such that it is modulated into a nearly trapezoidal wave shape having tilted leading and falling edges of the waveform. Also, it may be possible to use any structure capable of generating a modulation signal as the polarity is changed at a lower modulation frequency, such as a sinusoidal wave, a triangular wave, a stepped wave and a saw tooth wave (See FIG. 9) except a nearly rectangular wave, than an acoustic resonant frequency for exciting the mode in which the discharge arc is made straight. Furthermore, the polarity need only be changed even if the modulation signal contains more or less DC components, and any positive-negative asymmetrical waveform may be used.

Also, in the first embodiment, the description has been made of the structure in which the electrostatic capacity of the capacitor 20 is changed to make the depth of modulation variable, but if the structure is arranged such that the inductance of the choke coil 19 constituting the filter circuit can be varied, the depth of modulation becomes smaller when the inductance is made larger, while the depth of modulation becomes larger when the inductance is made smaller, and the depth of modulation can be made variable. Therefore, a similar effect can be obtained, and the width of change in the depth of modulation can be made larger when both the choke coil 19 and the capacitor 20 can be changed.

Also, although the DC power source 13 has been constituted by a step-down chopper circuit, other circuit systems such as a step-up chopper circuit and an inversion chopper circuit may be used, and other structure may be used so long as there can be outputted waveform in which a predetermined DC bias has been superimposed on a center line whose instantaneous value periodically fluctuates at an acoustic resonant frequency for exciting the mode in which the discharge arc is made straight.

Also, although the control circuit 24 has been constructed to control the on-off ratio of the transistor 17 so that the lamp power becomes a rated value, the structure may be arranged such that there is provided effective value varying means for varying the effective value of a modulation signal to vary the lamp power. In particular, it is effective for supplying power exceeding the rated value at the beginning of operating in order to supplement the optical output at the beginning of operating, and controlling modulated light among others.

As described above, the present invention is capable of realizing an excellent discharge lamp operating apparatus capable of preventing unstable phenomena such as deformation of a discharge arc, and forming a stable, straight discharge arc irrespective of extinction of the discharge lamp.

What is claimed is:

1. A discharge lamp operating apparatus for operating a discharge lamp having a glass envelope for defining a discharge space and a pair of electrodes which are hermetically sealed within said glass envelope and are opposed to each other, comprising:

generation means for generating a waveform signal having an acoustic resonant frequency for exciting a mode, in which a discharge arc between said pair of electrodes is straightened; and modulation means for modulating said waveform signal so that a polarity of a center line of said waveform signal is alternately changed at a lower frequency than said acoustic resonant frequency, wherein if a value of an amplitude of said waveform signal from peak to peak is $\alpha$, and an effective value of said modulated waveform signal is $\beta$, then a depth of modulation $\alpha/\beta$ at a beginning of operation becomes equal to or less than a depth of modulation $\alpha/\beta$ at an operation under rated condition.

2. A discharge lamp operating apparatus according to claim 1, wherein the center line of said waveform is maintained at a constant level.

3. A discharge lamp operating apparatus according to claim 2, wherein said acoustic resonant frequency is determined by a sound velocity in a discharge space medium of the discharge lamp, and a length of a discharge space, the length being intersecting said discharge arc.

4. A discharge lamp operating apparatus according to claim 2, wherein said discharge lamp has been hermetically filled with at least metal halide or mercury as filling material within said glass envelope.

5. A discharge lamp operating apparatus according to claim 2, wherein a period in which said depth of modulation $\alpha/\beta$ of said discharge lamp at the beginning of operating becomes equal to or less than a depth of modulation $\alpha/\beta$ at the operation under the rated condition is actually an entire period until the operation under the rated condition is reached.

6. A discharge lamp operating apparatus according to claim 2, wherein a period in which said depth of modulation $\alpha/\beta$ of said discharge lamp at the beginning of operating becomes equal to or less than a depth of modulation $\alpha/\beta$ at the operation under the rated condition is 10 ms or less.

7. A discharge lamp operating apparatus according to claim 2, wherein at the beginning of operating there is such period where said depth of modulation $\alpha/\beta$ has a value of 0.3 or less.

8. A discharge lamp operating apparatus according to claim 2, wherein said discharge lamp operating apparatus has detection means for detecting a lamp characteristic of said discharge lamp, and changes said depth of modulation $\alpha/\beta$ in response to a change of said lamp characteristic.

9. A discharge lamp operating apparatus according to claim 8, wherein said detection means detects bulb temperature, lamp voltage, lamp impedance, or optical output as the lamp characteristic.

10. A discharge lamp operating apparatus according to claim 2, wherein said depth of modulation $\alpha/\beta$ of said discharge lamp at the beginning of operating has a period in which the depth of modulation $\alpha/\beta$ gradually increases.

11. A discharge lamp operating apparatus according to claim 2, wherein said depth of modulation $\alpha/\beta$ of said discharge lamp at the beginning of operating has a period in which the depth of modulation $\alpha/\beta$ stepwise increases.

12. A discharge lamp operating apparatus according to claim 11, wherein said modulation means has effective value varying means for changing the effective value of said signal modulated.

13. A discharge lamp operating apparatus according to claim 2, wherein said generation means has frequency varying means for generating waveform having a frequency component in response to a change in the frequency component of the acoustic resonant frequency for exciting the mode in which a discharge arc is made straight.

14. A discharge lamp operating apparatus according to claim 2, wherein said modulation means has effective value varying means for changing the effective value of said signal modulated.

15. A discharge lamp operating apparatus according to claim 10, wherein the frequency component of the acoustic resonant frequency for exciting the mode in which a discharge arc occurring between said pair of electrodes is made straight, is a frequency obtained concerning the discharge lamp in the case of re-ignition after extinction period is sufficiently taken.

16. A discharge lamp operating apparatus according to claim 2, wherein the frequency component of the acoustic resonant frequency for exciting the mode in which a discharge arc occurring between said pair of electrodes is made straight, is a frequency obtained concerning the discharge lamp in the case of re-ignition after extinction period is sufficiently taken.

17. A discharge lamp operating apparatus according to claim 1, wherein said acoustic resonant frequency is determined by a sound velocity in a discharge space medium of the discharge lamp, and a length of a discharge space, the length being intersecting said discharge arc.

18. A discharge lamp operating apparatus according to claim 1, wherein said discharge lamp has been hermetically filled with at least metal halide or mercury as filling material within said glass envelope.

19. A discharge lamp operating apparatus according to claim 1, wherein a period in which said depth of modulation $\alpha/\beta$ of said discharge lamp at the beginning of operating becomes equal to or less than a depth of modulation $\alpha/\beta$ at the operation under the rated condition is actually an entire period until the operation under the rated condition is reached.

20. A discharge lamp operating apparatus according to claim 1, wherein a period in which said depth of modulation $\alpha/\beta$ of said discharge lamp at the beginning of operating becomes equal to or less than a depth of modulation $\alpha/\beta$ at the operation under the rated condition is 10 ms or less.

21. A discharge lamp operating apparatus according to claim 1, wherein at the beginning of operating there is such period where said depth of modulation $\alpha/\beta$ has a value of 0.3 or less.

22. A discharge lamp operating apparatus according to claim 1, wherein said discharge lamp operating apparatus has detection means for detecting a lamp characteristic of said discharge lamp, and changes said depth of modulation $\alpha/\beta$ in response to a change of said lamp characteristic.

23. A discharge lamp operating apparatus according to claim 1, wherein said depth of modulation $\alpha/\beta$ of said discharge lamp at the beginning of operating has a period in which the depth of modulation $\alpha/\beta$ gradually increases.

24. A discharge lamp operating apparatus according to claim 1, wherein said depth of modulation $\alpha/\beta$ of said discharge lamp at the beginning of operating has a period in which the depth of modulation $\alpha/\beta$ stepwise increases.

25. A discharge lamp operating apparatus according to claim 24, wherein said modulation means has effective value varying means for changing the effective value of said signal modulated.

26. A discharge lamp operating apparatus according to claim 1, wherein said generation means has frequency varying means for generating waveform having a frequency component in response to a change in the frequency component of the acoustic resonant frequency for exciting the mode in which a discharge arc is made straight.

27. A discharge lamp operating apparatus according to claim 1, wherein said modulation means has effective value varying means for changing the effective value of said signal modulated.

28. A discharge lamp operating apparatus according to claim 1, wherein the frequency component of the acoustic resonant frequency for exciting the mode in which a discharge arc occurring between said pair of electrodes is made straight, is a frequency obtained concerning the discharge lamp in the case of re-ignition after extinction period is sufficiently taken.

29. In a discharge lamp having a glass envelope and a pair of opposing electrodes sealed within the glass envelope, a method for forming a discharge arc between the electrodes comprising the steps of:

(a) generating a waveform signal at an acoustic resonant frequency for affecting the discharge arc between the electrodes, and (b) modulating said waveform signal at a lower frequency than said acoustic resonant frequency so that a polarity of a center line of said waveform signal is alternately changed at said lower frequency, wherein if (a) a value of an amplitude of said waveform signal from peak to peak is $\alpha$, (b) an effective value of said modulated waveform signal is $\beta$, and (c) a depth of modulation $\alpha/\beta$ at a beginning of operation is equal to or less than a depth of modulation $\alpha/\beta$ at an operation under rated condition, then the discharge arc is straightened between the electrodes.

* * * * *

UNITED STATES PATENT AND TRADEMARK OFFICE
CERTIFICATE OF CORRECTION

PATENT NO. : 6,130,508
DATED : October 10, 2000
INVENTOR(S) : Miyazaki et al.

It is certified that error appears in the above-identified patent and that said Letters Patent is hereby corrected as shown below:

<u>Title page</u>,
Item [56] References Cited, FOREIGN PATENT DOCUMENTS, insert:

-- 0785702    7/1997  European Pat. Off.
    0443795    8/1991  European Pat. Off.
    0713352    5/1996  European Pat. Off. --

<u>Column 10</u>,
Line 64, delete "10" and insert -- 17 --.

Signed and Sealed this

Twenty-third Day of October, 2001

Attest:

NICHOLAS P. GODICI
*Attesting Officer*    *Acting Director of the United States Patent and Trademark Office*